United States Patent
Chun

(10) Patent No.: US 7,013,837 B2
(45) Date of Patent: Mar. 21, 2006

(54) METHOD FOR BUILDING ENVIRONMENT-AFFINITIVE PIGPEN AND PIGPEN STRUCTURE

(76) Inventor: Kil Sang Chun, Bohoonwon 338. Hakwangkyo-dong Jangan-gu, Suwon City, Gyeonggi-do, 440-260 (KR)

(*) Notice: Subject to any disclaimer, the term of this patent is extended or adjusted under 35 U.S.C. 154(b) by 0 days.

(21) Appl. No.: 10/676,511

(22) Filed: Oct. 1, 2003

(65) Prior Publication Data

US 2004/0069239 A1    Apr. 15, 2004

(30) Foreign Application Priority Data

Oct. 10, 2002    (KR) .................... 10-2002-0061702

(51) Int. Cl.
*A01K 1/01*    (2006.01)

(52) U.S. Cl. .................... 119/447; 119/444
(58) Field of Classification Search ......... 119/444–447
See application file for complete search history.

(56) References Cited

U.S. PATENT DOCUMENTS

| | | | | |
|---|---|---|---|---|
| 1,765,925 A * | 6/1930 | Lodige, Jr. | ................. | 119/446 |
| 2,255,806 A * | 9/1941 | Overson | ................. | 119/445 |
| 3,203,033 A * | 8/1965 | Banse | ................. | 16/262 |
| 3,584,603 A * | 6/1971 | Rutherford | ................. | 119/446 |
| 3,726,254 A * | 4/1973 | Conover | ................. | 119/445 |
| 3,884,804 A * | 5/1975 | Robinson et al. | ................. | 210/763 |
| 4,175,515 A * | 11/1979 | Bradley | ................. | 119/447 |
| 4,348,986 A * | 9/1982 | Marrs | ................. | 119/508 |
| 4,402,282 A * | 9/1983 | Steidinger | ................. | 119/447 |
| 5,203,542 A * | 4/1993 | Coley et al. | ................. | 256/10 |
| 5,372,091 A * | 12/1994 | Rhodes | ................. | 119/505 |
| 5,890,454 A * | 4/1999 | Moore, Jr. | ................. | 119/447 |
| 5,950,565 A * | 9/1999 | Guyot | ................. | 119/454 |
| 6,405,680 B1 * | 6/2002 | Fukunaga | ................. | 119/444 |

* cited by examiner

*Primary Examiner*—Teri Pham Luu
*Assistant Examiner*—Kimberly S. Smith
(74) *Attorney, Agent, or Firm*—Ladas & Parry LLP

(57) ABSTRACT

A pig pen structure has a walking passage and a plurality of pig houses for housing an animal installed along the walking passage. Each pig house has an evacuation room, a lodging room having front, back, and two side walls, and an evacuation room gate installed between the evacuation room and the lodging room. The evacuation room is accessible to the animal for excretion when the evacuation room gate is opened. The evacuation room gate when closed becomes a part of the back wall. A urine tube is installed on the bottom of the evacuation room, so that the excreted urine in the evacuation room flows down to the urine tube to remove the excreted urine outside the pig house. The plurality of the pig houses is arranged so that the front walls of the pig houses adjoin the walking passage. A continuous passage way is formed by the evacuation rooms along the back wall of the lodging room when the evacuation room gates of the pig houses are in closed position.

6 Claims, 9 Drawing Sheets

METHOD FOR BUILDING ENVIRONMENT-AFFINITIVE PIGPEN AND PIGPEN STRUCTURE

BACKGROUND OF THE INVENTION

1. Field of the Invention

The present invention relates to a facility of preventing environmental pollution and processing wastewater such as excretion and urine, and sewage due to water cleaning, and more particularly, to a method for building a functional pigpen and a pigpen structure, which is built by modifying various unreasonable facilities in pig houses into an economic structure to play a multiple role, greatly reducing a cost for building and installing the pigpen, heightening productivity of pigs with a sanitary breeding management having no bacilli, harmful insects, and offensive odor, and providing a comfortable circumstance capable of heightening a working efficiency and preventing environmental pollution.

2. Description of the Related Art

In general, wastewater such as excretion and urine, and sewage due to water cleaning is generated in a pigpen during breeding. The excretion and urine pollute underground water or river, and the offensive odor has a bad influence upon a comfortable living condition. Accordingly, in view of the governmental position, a pigpen should be standardized and controlled.

The governmental control has caused a pig breeding business to be recently enlarged on a large scale. As a result, an amount of polluted materials such as wastewater including excretion and urine, and sewage due to water cleaning becomes massive to thereby cause environmental pollution and destruction which pollutes river and underground water. Also, wastewater mixed with excretion and urine, and sewage due to water cleaning is rotten to generate offensive odor, to thus have a bad influence upon the living circumstances of neighbors and towns as well as the inside and outside of the pigpen. As a result, the government should control a pig breeding business.

As an example, referring to FIGS. 1A, 1B, 2A–2B, and 3, FIG. 1A is an exploded perspective view showing a conventional pigpen structure according to an existing pigpen standard design drawing (Korean Government Construction Department Publication No. 1993-200). FIG. 1B is a side cross-sectional view of FIG. 1A. FIGS. 2A–2B is an exploded perspective view showing a partial structure of the lateral cross-section of FIG. 1A. FIG. 3 is a plan view of a conventional pigpen.

A facility of an existing pigpen 100 according to the existing standard design drawing includes sewage channels 2 installed in the left-hand and right-hand of a working passage 1 formed in the pigpen 100. Each of the left and right pig houses 10 includes vertically shaped pipe partitions 22a and 23a which are installed upright with a height of 1.2 m~1.5 m. A vertically shaped pipe partition is installed in the front face of each pig house 10, and thus a worker cannot feed directly into a feed bucket 13 in the pig house 10. Accordingly, an iron-made feed input container 26 is attached on part of each partition 23a, with which feed is not be equally supplied but inconveniently and indirectly input all at a time. The partition 23a is used as an entrance and exit gate when the excretion generated in the left and right pig houses or the excretion and urine mixed with sawdust is collected and then water-cleaned Wastewater channels are installed in the left and right of the working passage 1. As a result, the working passage 1 is always in a polluted state, produces offensive odor, and provides a habitat for bacilli and harmful insects. Also, the vertically shaped pipe partitions 22a and 23a cause an economical burden on an installation thereof. If block wall partitions are installed as an alternative, sunlight is intercepted and wastewater is absorbed on the block walls, and thus heightens humidity, to thereby provide a habitat for bacilli and harmful insects, which becomes a factor for lowering a growth rate of pigs, and further pollutes dark and dim pig houses 10.

Also, a water supply pipe 25 is vertically connected to a plastic water supply vessel 24 installed in the rear surface of each pig house 10, at a position higher than that of the partition 22a. The water supply pipe 25 is connected to a water supply source of a water facility in the pigpen. As a result, the plastic water supply vessel 24 can be frozen in winter season.

Also, a wastewater storage tank 30a is installed with a predetermined width and length under the left and right pig houses 10 from the working passage 1. If the wastewater storage tank 30a is full of wastewater within about 20 days (a rotting function is the most activated for 30 to 40 days after generation of the wastewater, to thus generate ammonia gas and other noxious gas, see FIG. 4), a wastewater tube installed in one end of the pigpen 100 is made opened, and then the wastewater is moved to a wastewater storage tank (not shown) located out of the pigpen 100. In the case that a subsidiary facility for purifying the wastewater in a wastewater separation and filtering processing facility (not shown) is burdensome, a stirrer facility for mixing sawdust with the wastewater is provided as an alternative. However, if an amount of the wastewater is suddenly increased, the overflow wastewater can pollute the river and the underground water.

Also, the bottom surfaces of the pig houses corresponding to the underground wastewater storage tank formation position are covered with iron-made or wooden bottom plates 31a. On each bottom plate 31 is provided excretion passing holes 32a each having a size preventing the pig's foot from falling into the hole. Accordingly, excretion and urine and sewage due to water cleaning fall into the wastewater tank under the pig house 10. That is, when pigs are eating, sleeping and playing in the pig house with the excretion and urine and sewage due to water rubbed and tread by their bodies and feet, the excretion and urine and sewage due to water fall into and are collected in the underground wastewater storage tank 32 through the excretion passing holes 32a.

As described above, the existing pigpen 100 constructed by the conventional standard design drawing has been built under the wrong recognition that pigs are dirty animals which do not discriminate an evacuation place from a lodging place. As a result, excretion and urine are in a muddle at a place of the pig house 10, which pollutes the bottom plates 31a, the partition and block walls, the bottom surface of the pig house 10 and the feed bucket 13, in whole, and smells offensive odor due to the moisture.

Also, the bottom plates 31a are always wet due to the successively evacuated excretion and urine, which become habitats of various bacilli, or harmful insects during a zymolysis process of the wastewater contained in the underground storage tank. These circumstances raise various diseases such as fatal pneumonia, bronchial disease, or skin disease to pigs, and thus have a bad influence on a pigs breeding businessman due to a high death rate and a low growth rate of pigs and a deteriorated international competitiveness of a pig breeding business.

Pigs are severely stressed due to the unreasonable structure in the pig houses 10. Accordingly, it is necessary to perform water cleaning with high-pressure sprayed water. As a result, an amount of wastewater is increased due to the mixture of excretion and urine and sewage due to water cleaning, which requires for a bigger underground wastewater storage tank 30a in each pig house 10. Accordingly, a self-control purifying facility and a public pigpen wastewater processing facility face to social problems based on natural surroundings.

An amount of wastewater generated per day from a pig is 8.6 kg which is shown in Korean Government Environment Department Publication No. 1999-109. Since a total number of pigs bred in 2001 is about 88 millions, a yearly amount of wastewater generated is about 27 million tons. A BOD concentration of the wastewater is 20,000~25,000 ppm. By the way, since a local facility built in each province is a public pigpen wastewater processing facility which processes the wastewater based on the BOD concentration of 5,000 ppm, such facilities cannot run at present.

As an alternative of solving the above problems, the underground wastewater storage tank 30a is made closed. The cement bottom is covered with sawdust of 40 cm~50 cm, on which pigs are evacuated and living. This raises an ill effect. Sawdust includes components of tannin acid and lignin acid which are harmful for pigs. Thus, if pigs eat the sawdust, they suffer from indigestion, and if they breathe sawdust, they suffer from pneumonia. Also, since noxious gases are generated due to a rotting function of excretion mixed with sawdust, a growth rate is reduced and a death rate is increased. Collection of excretion mixed with sawdust and water cleaning are performed in the working passage 1. Since the working passage 1 is always in a polluted state, offensive odor and bacilli and harmful insects are generated in both the pig houses 10 and the working passage 1.

As an alternative in case that an investment cost is burdensome, the bottom surface of each pig house 10 is plastered with concrete without having a wastewater storage tank 30a under each pig house 10, and then sawdust of 50 cm or so (or 1.0 m) high is put into the pig house 10, on which pigs are living and thus evacuated excretion and urine are naturally mixed with sawdust. Thus, the underground wastewater storage tank 30a need not be installed, but an amount of sawdust mixed with the excretion and urine becomes massive, which requires for a subsidiary processing facility. Also, since all the things are accomplished in the working passage 1, a manpower required becomes double. Thus, the pigs breeding business is one of 3D (Dirty; Difficulty and Danger) industries, which causes a difficulty in obtaining a manpower. Also, since the height of the partition is heightened by the height of the sawdust laid, the partitions screen pigs from being visible to a worker which prevents sanitary breeding management.

Also, since the structure of the working passage 1 has a width of 1.05 m and the front-surface vertically shaped pipe partition is installed upright with a height of 1.2~1.5 m, working space is narrow. Thus, it is impossible to perform all the works with a shovel while moving the upper body of a worker. As an alternative, a business person installs a passage with a width of 1.5 m~2.0 m and also sewage channels 2 in the left and right sides of the passage to convenience all works. However, since a worker should bend his or her upper body when he or she supplies food into the feed buckets 13 in the left and right pig houses, a physical fatigue is added and a feeding time is increased.

Also, since the vertically shaped partitions 23a are installed in the front surfaces of the pig houses, according to the existing standard design drawing, it is difficult to supply food from the working passage 1. Thus, an iron-made feed input bucket 26 is attached on part of the vertically shaped partition in each pig house 10. Meanwhile, length of a feed bucket 13 attached on the bottom of the pig house 10 corresponds that of the feed input bucket 26. Thus, if feed is put into the feed input bucket 26, pigs fight crying with each other when they eat since the length of the feed bucket 13 is short in comparison with the number of pigs, which makes the pigs stressed. During fighting, feed are scattered out of the pig house, which causes a loss of feed.

Meanwhile, in the structure of the pigpen 100 according to the existing standard design drawing, the partitions constituting the pig house 10 are made of metal pipes in order to secure economic installation, breeding management convenience, working efficiency, ventilation and lighting for sanitary management. However, since the partitions are installed in vertical shape, it is difficult to supply feed for a feed bucket 13 installed in the pig house 10. As an alternative, a feed input bucket 26 is attached on part of the vertically shaped partition in each pig house 10. Accordingly, the food supplied in the feed input bucket 26 should move to the feed bucket 13. In the structure of the pigpen 100 according to the existing standard design drawing, when the pipe partition in each pig house 10 is vertically installed, an amount of pipes consumed for the metal pipe partition is calculated as follows.

The size of each of the left and right pig houses 10 along the working passage 1 is 3 m×4.125 m. A pipe is cut into eight pieces of 1.35 m (an average length of 1.2 m~1.5 m) in units of meter, and then the eight pieces of pipes are vertically welded. In this way, if four partitions are installed upright around the four walls of the pig house, an amount of consumed vertically shaped partitioning pipes 22a and 23a becomes 182 m. Also, since the whole length of the pig houses 100 according to the existing standard design drawing is 92 m, a total number of the pig houses 10 which are installed in the left and right of the working passage 1 is 58. Accordingly, a total length of the total pipes consumed for the vertically shaped partitioning pipes in the pig houses 10 becomes 10,556 m (=58 rooms×182 m).

Here, the water supply pipe 25 connected to the plastic water supply vessel 24 in each pig house 10 consumes a water supply pipe of 8 m. Since the total number of the whole pig houses is 58, an amount of the water supply pipes consumed is 464 m (=58 rooms×8 m). Accordingly, the total length of the pipes consumed is 13,054 m in addition to the metal partitioning pipes.

As described above, in order to install the vertically shaped partitions, metal pipes are cut and then welded which causes cost of a welding process for the vertically shaped partitions. Also, each of the 58 plastic water supply vessels are installed in each pig house 10, and each of the 58 iron-made feed input buckets 26 are installed in each pig house 10. As an alternative because the above structure is burdensome economically, a gate is installed on the vertically shaped partition in the front surface of each pig house 10, and an iron-made feed input bucket 26 is installed on part of the gate. It is general to install cement block wall partitions in the remaining three walls.

Therefore, the existing, pigpen installation structure has the following problems.

Due to polluted circumstances in a pigpen because of wastewater, productivity of pig meat is not increased up to a level of developed countries which perform a sanitary breeding management under the comfortable circumstances in and out of the pigpen.

Since materials consumed various structures and elements in the pigpen are not utilized in multiple purposes, only subsidiary facilities are increased which adds an economical burden on a breeding business person; to thereby increase a production cost.

In view of the structural improvement in the pigpen, a working efficiency of breeding pigs is not accomplished, and thus the breeding business is not escaped from a 3D business group to thereby cause a difficulty in securing a manpower.

SUMMARY OF THE INVENTION

To solve the above problems, it is an object of the present invention to provide a method for building an environment-affinitive pigpen and a pigpen structure in which a structure of a pig house in the pigpen is divided into an evacuation room, a lodging room, and a feed bucket, so that pigs evacuate excretion and urine in the evacuation room, to thereby prevent pollution of the lodging room and to thus constitute comfortable and sanitary breeding circumstances, and so that excretion evacuated in the evacuation room is collected in a lump and urine naturally flows down to thereby automatically separately collect the excretion and urine and convenience collection of excretion and urine.

It is another object of the present invention to provide a method for building an environment-affinitive pigpen and a pigpen structure in which a power cable is installed on a partitioning pipe in the pig house, horizontally with respect to the pipe, to thereby build the height of the partitioning pipe with half the height in comparison with the existing partitioning pipe, and to thus save a facility cost.

It is still another object of the present invention to provide a method for building an environment-affinitive pigpen and a pigpen structure in which the height of the partition in the pig house is lowered to thereby facilitate an observing of the pig breeding states, and enhance a working efficiency.

It is yet another object of the present invention to provide a method of building an environment-affinitive pigpen in which a pig house is divided into an evacuation room and a lodging room so that urine excreted in the evacuation room is naturally moved into an external urine storage tank, and in which if each gate of the evacuation rooms is opened, pigs cannot go out of the lodging rooms, and the evacuation rooms are converted into a working passage to thereby conveniently and easily do an excretion collection work and separately collect excretion and urine.

It is still yet another object of the present invention to provide a method of building an environment-affinitive pigpen having a heating facility, in which pipes constituting each pig house are utilized as water supply pipes and they are used as heating pipes.

It is a further object of the present invention to provide a method of building an environment-affinitive pigpen, in which excretion and urine can be separately collected without water cleaning, so that a BOD concentration of the urine is within 5,000 ppm, to thereby water-process the urine through a public wastewater processing facility and make the excretion decomposed at a low cost.

It is still a further yet another object of the present invention to provide a method of building an environment-affinitive pigpen, in which an underground wastewater storage tank is not installed under each pig house, and thus urine is made to flow into an underground urine storage tank in the field of making excretion decomposed far away from a pigpen, so that ammonia gas or noxious gas caused by rotting of the wastewater does not go up to a pig house to thereby prevent generation of offensive odor fundamentally, and provide a comfortable and sanitary pigpen.

It is still yet a further object of the present invention to provide a method of building an environment-affinitive pigpen, in which no works such as excretion collection works and going in and out of a pig house which can cause a series of pollutions are performed in a working passage, and thus the working passage can be prevented from being dirty due to the wastewater to thus maintain the working passage to be cleanly and to thus improve insanitary and uncomfortable working conditions to resultantly help overcoming a difficulty in finding a manpower.

To accomplish the above object of the present invention, according to an aspect of the present invention, there is provided a method of building an environment-affinitive pigpen breeding pigs in pig houses successively provided in the lengthy direction of the pigpen, in which the pigpen is partitioned into pig houses, each pig house being divided into a feed bucket, a lodging room, and an evacuation room, where an entrance and exist gate which is opened and closed on a frame for partitioning the pig houses installed between the pig houses is provided, and if the gate is opened, an evacuation room in a successively installed pig house is converted into a single passage to collect excretion, in which case urine excreted in the evacuation room flows down into an external urine storage tank out of the pigpen through a urine tube.

The evacuation room is slantly formed on the bottom surface in, order to collect the urine, so that the urine naturally flows down into the urine tube connected to the external urine storage tank out of the pigpen, to thereby separately collect the urine from the excretion without having an additional labor force, and to thereby collect the urine within a BOD concentration of 5,000 ppm, and thus to enable the wastewater of the urine to be processed at a low cost through a nationwide public wastewater processing facility, and to resultantly re-run a resting wastewater processing facility.

The pipes of partitions constituting each pig house are installed horizontally, in which a power cable is installed so that pigs do not step over the horizontally installed pipes, to thus enable the height of the partitions to be about half the existing height, and to thus save the facility cost and widen a field of vision in the pigpen to easily observe and sanitarily control the breeding state of the pigs.

Also, each pig house is divided into the evacuation room and the lodging room, so that the lodging room is not polluted by excretion, to thereby prevent the pigs from suffering from diseases basically and prevent offensive odor to provide a sanitary and comfortable working condition.

Also, since the pipes for partitions installed between the pig houses and the pipes positioned toward the working passage are all horizontally installed, in which the lower-end pipe can be utilized as a water supplying pipe, and the left and right partitioning pipes can be utilized as heated water circulation pipes, that is, the pipes have the functions of the partitioning and circulating the water supply and heated water.

The evacuation room provides a multiple function playing a role of a passage function which enables pigs to go in and out from the pig house and a working passage function for collecting excretion, in addition to the evacuation room.

Also, if an evacuation room gate provided between the evacuation room and the lodging room is opened toward the lodging room, pigs cannot go out from the pig house, to thereby perform an excretion collection work freely from interruption of the pigs during collection of excretion. Meanwhile, if an evacuation room gate provided between the evacuation room and the lodging room is opened toward the evacuation room, the evacuation room and the lodging room communicate with each other and the neighboring evacuation rooms are blocked from each other to thereby constitute an independent pig house.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Hereinbelow, a method of building an environment-affinitive pigpen, and a pigpen structure according to the present invention will be described in detail with reference to the accompanying drawings.

Figure 5A:
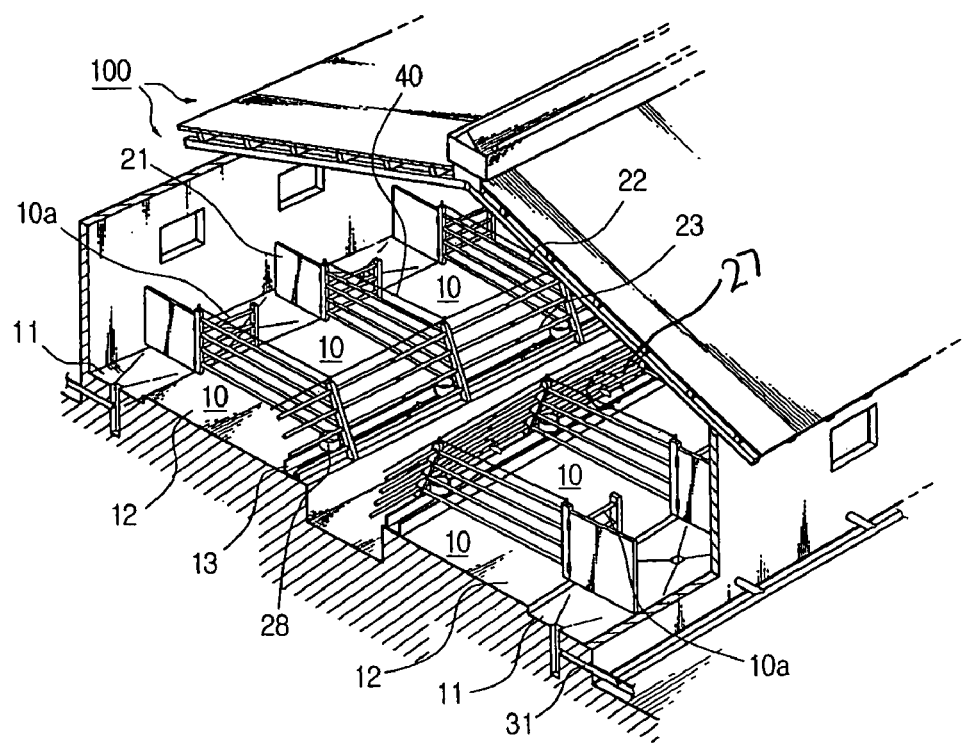
FIGS. 5A–5B are exploded perspective view partially showing the essential portions of a pigpen according to the present invention.
Figure 5B:
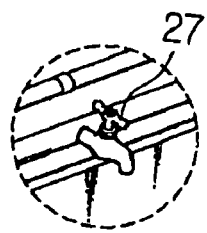

FIGS. 5A–5B are perspective view showing a pigpen structure according to the present invention. The same elements as those of the existing elements are assigned the same reference numerals as those of the existing elements.

In the drawings, a reference numeral 100 denotes the whole of a pigpen. A reference numeral 1 denotes a working passage through which a worker or workers can pass in the inside of the pigpen 100. A reference numeral 10 denotes a pig house in which pigs are bred. A reference numeral 20 denotes partitioning pipes including partitioning pipes 22 and 23 which partition the pig house. A reference numeral 30b denotes a urine storage tank in which urine is input.

The pig houses 10 can be successively and symmetrically installed in the left and right sides of the center of the working passage 1, or either of the left and right sides thereof.

Figure 6:
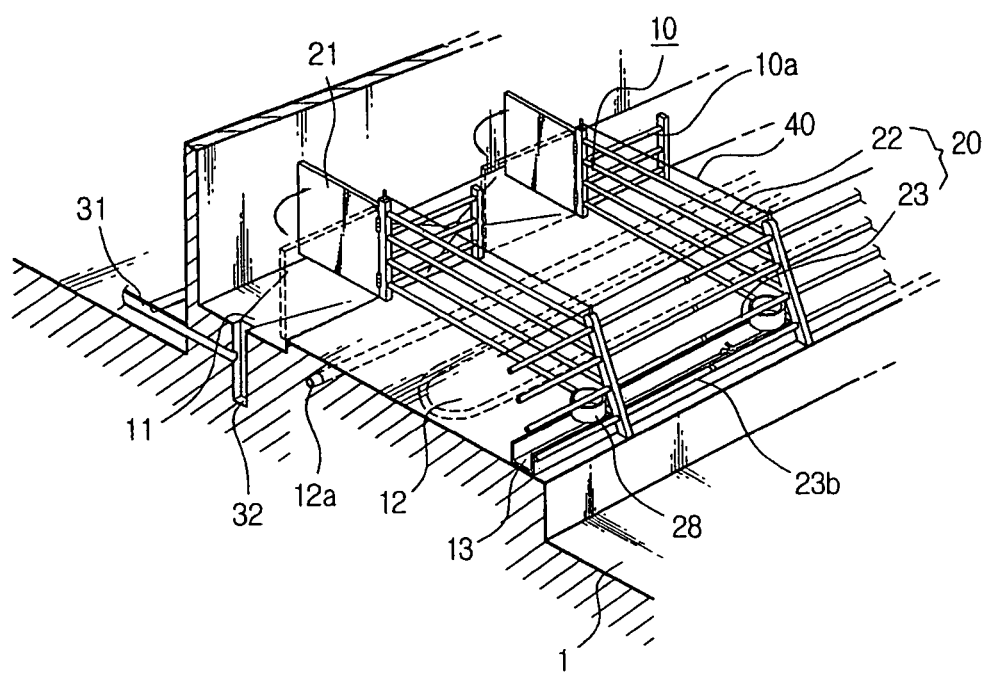
FIG. 6 is an exploded enlarged perspective view partially showing the structure in pig houses according to the present invention.

As shown in FIG. 6, the pig house 10 is partitioned by partitioning pipes 10a so that it is divided into an evacuation room 11 in which pigs excrete and a lodging room 12 in which pigs live. This is a result from the long observation and experiment for habits with respect to excretion of pigs.

That is, pigs have certain intelligences with which pigs can discriminate an excreted place from a sleeping place. Thus, the evacuation room and the lodging room are separately provided by using the above habits of pigs.

Figure 7A:
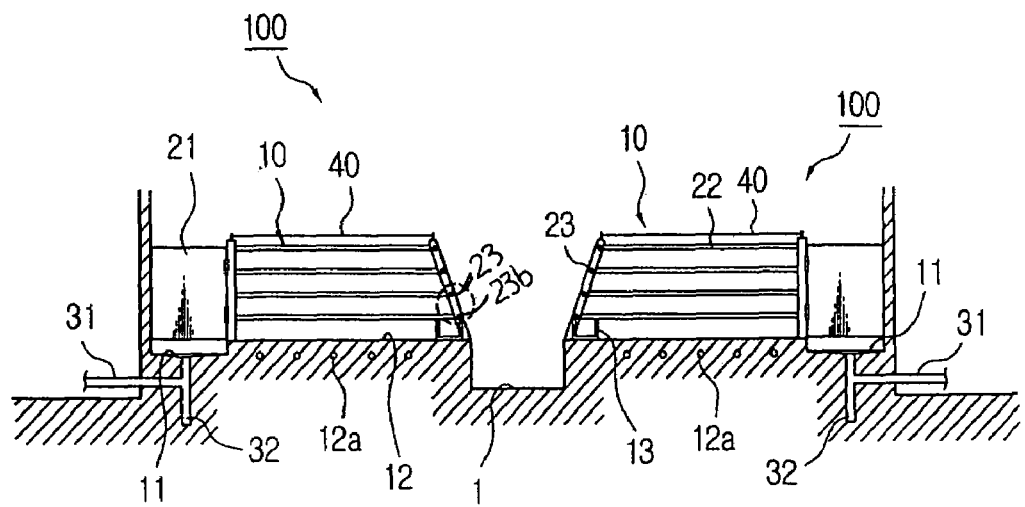
FIGS. 7A–7B are cross-sectional views of the pigpen structure according to the present invention.
Figure 7B:
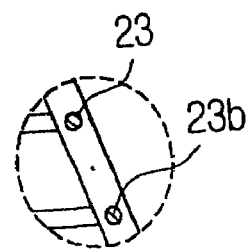

FIG. 6 is an exploded enlarged perspective view partially showing the structure in pig houses according to the present invention. FIGS. 7A–7B are cross-sectional view of the pigpen structure of FIG. 6. Referring to FIGS. 6 and 7A–7B, a feed bucket 13 is installed in the lodging room 12 of the front surface of the pig house in the lengthy direction of the pigpen. The evacuation room 11 is preferably installed at a place lower than the bottom surface of the lodging room 12. According to a preferred embodiment of the present invention, the bottom surface of the evacuation room 11 is formed at a position lower y about 10~20 cm than that of the lodging room 12.

The reason is to prevent excretion of the evacuation room 11 from adhering to the pigs and moving into the lodging room 12 when the pigs reciprocate between the evacuation room 11 and the lodging room 12. Further, the bottom surface of each evacuation room 11 is slantly formed toward the central portion thereof. On the center of the evacuation room 11 is a urine tube 31 connected to a urine storage tank 30b buried at a place from away from the pigpen 100, for example, under an excretion decomposition area. A manhole is formed at the entrance of the urine tube 31 so that excretion does, not go in and urine naturally flows in.

The urine tube makes the urine excreted on the bottom surface of the evacuation room 11 go into the urine storage tank 30b. At a place in the middle of the urine tube is further installed an excretion sludge vessel 32 in order to collect a small amount of excretion separately before having arrived at the urine storage tank 30b when the small amount of excretion has been input together with the urine which has been input into the urine tube 31. The excretion deposited in the excretion sludge vessel 32 is removed by a special spoon. Thus, only excretion is left in the evacuation room 11.

An exit is provided in the evacuation room 11 and the lodging room 12, respectively, so that pigs can go in and out. The exit is opened and closed by the evacuation room gate 21. That is, as shown in the drawing, the evacuation room gate 21 is combined with a frame provided between the pig houses 10 so as to be opened and closed through a hinge.

Figure 9:
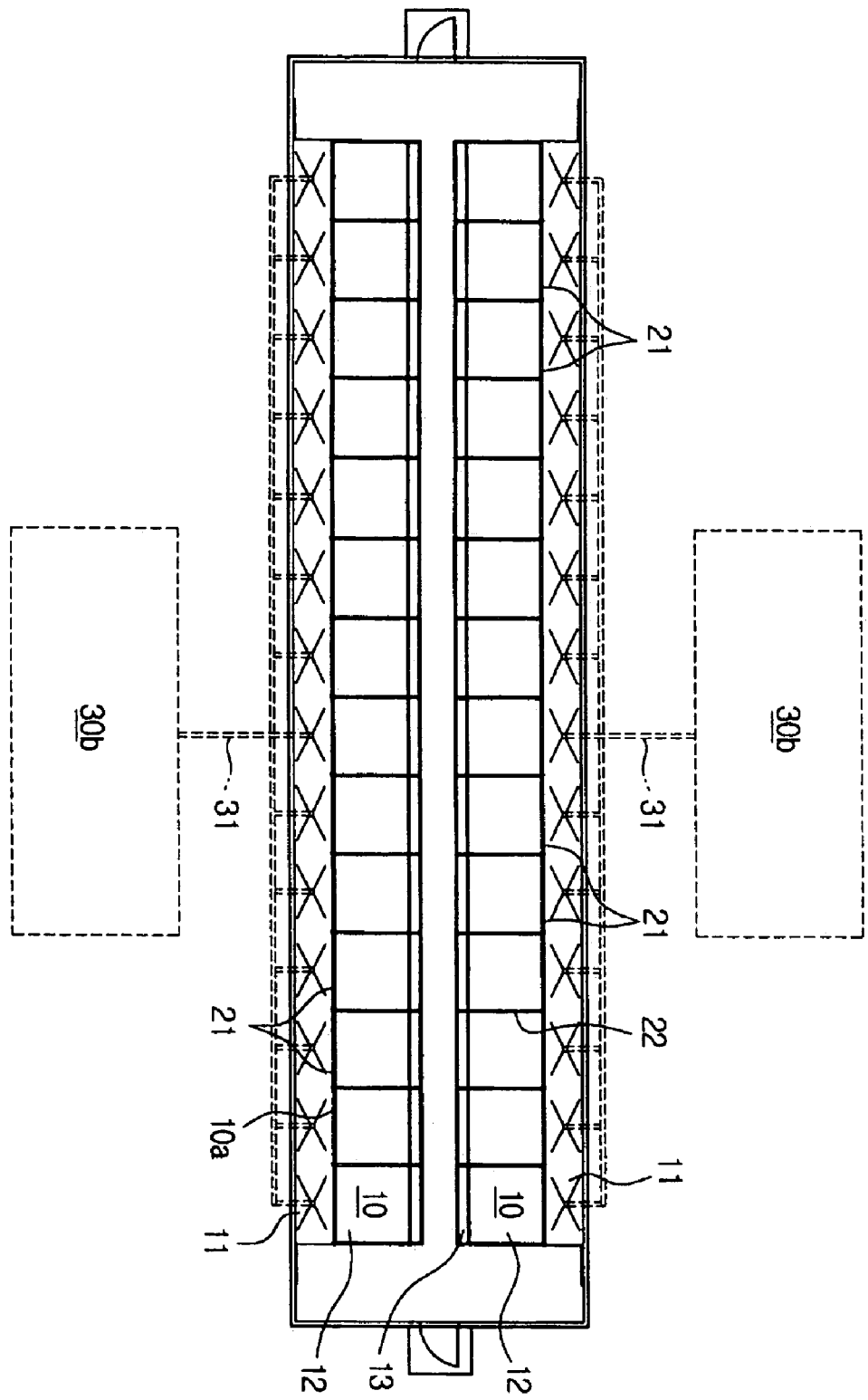
FIG. 9 is a plan view of a pigpen according to the present invention which is similar to that of FIG. 8, where an evacuation room is modified into a single path.

If the evacuation room gate 21 is opened toward the lodging room 12, pigs go in the lodging room 12, in which case the evacuation room 11 communicates with the neighboring evacuation rooms. As shown in FIG. 9, if the evacuation room gates 21 installed in the respective evacuation room 11 are successively opened toward the lodging rooms 12, all the evacuation rooms 11 are deformed into a single long working passage. The excretion is pushed out by a motor car at any one direction in the evacuation room 11, or the excretion is dug out by a plastic shovel to thereby remove the excretion to an excretion decomposition area easily and conveniently. Also, the evacuation room gates 21 are functional portions having an opening and closing function of an exit for making pigs go into the pig houses 10, respectively.

Figure 8:
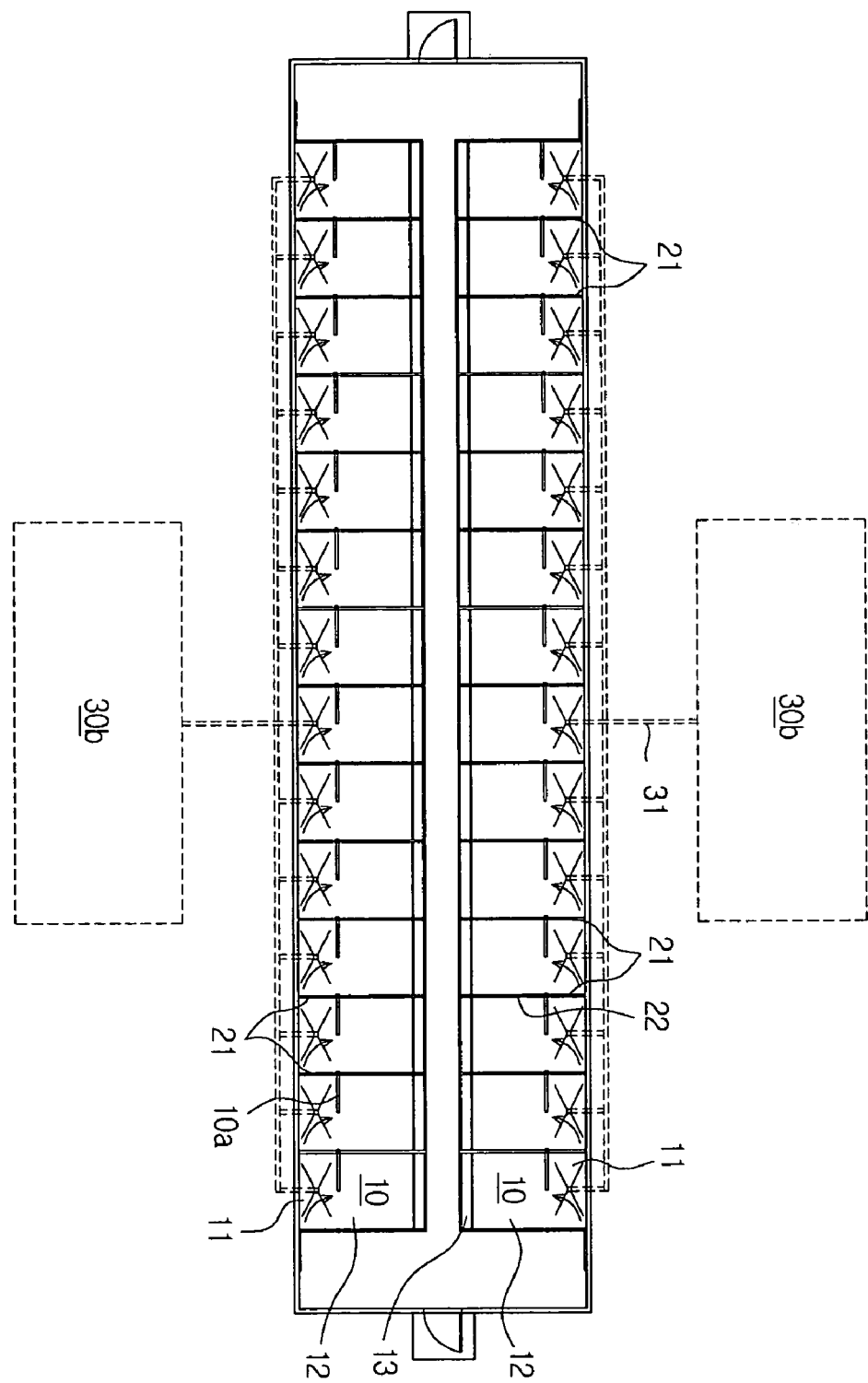
FIG. 8 is a plan view of a pigpen according to the present invention, in which evacuation rooms and a lodging rooms communicate with each other.

If the evacuation room gate 21 having a partitioning function is restored into an original position after having collected excretion as shown in FIG. 8, the evacuation room 11 and the lodging room 12 communicate with each other so that pigs can go in and out between the evacuation room 11 and the lodging room 12. Also, the evacuation room 11 is independently separated from an excretion collection passage or the pig house 10 is independently separated from each pig house.

In the present invention, the partitioning pipes 20 which partition the pig houses 10 are all installed horizontally. In particular, it is preferable that the front-side partitioning pipes 23 in the pig house 10 are slantly installed by about 60~70°.

The reason why the front-side partitioning pipes 23 in the pig house 10 have been slantly installed is to widen a space so that a worker can freely move the upper body although the width of the working passage 1 is formed more narrowly by about half than the existing working passage width of 1.5~2.0 m. Accordingly, a worker can freely work in the working passage. Also, since the width of the working passage can be reduced half the width of the existing working passage 1, an architectural area can be efficiently used.

However, when the partitioning pipes 20 are horizontally installed, pigs can go up the pipes. To prevent this, a power cable 40 is installed on the upper end of the pipes so that pigs cannot go up the pipes.

An electric switch is turned on so that current flows through the power cable 40 when a worker approaches the working passage 1. If the worker approaches the working passage 1, pigs may misunderstand that the worker will supply them with feed. In this case, as soon as pigs go up the horizontally installed pipes 20, they contact the power cable 40 and undergo a minor electric shock, which can prevent pigs from going up the pipes. If the worker passes away from the working passage 1, the electric switch is turned off to cut off current flowing through the power cable 40.

Since the power cable 40 is installed on the upper portion of the partitioning pipes 20 in the present invention, the height of the existing partitioning pipes 20 can be lowered by about half. As a result, a cost of facilities in the pigpen can be saved by about one third or more. Also, since a field of vision in the pigpen 100 is widened, a breeding state of pigs can be easily checked and a sanitary management breeding is easily accomplished.

The front-side partitioning pipes 20 in the pig house 10 are horizontally installed, and the lowest-end pipe is used as a water supply pipe 23b. That is, the lowest-end pipe of the front-side partitioning pipes 20 in the pig house 10 is connected to a water supply pipe to automatically feed water therein. Thus, water can be automatically supplied to a feed bucket 13.

Further, an automatic water supply 28 and a water tap 27 are additionally provided in the water supply pipes 23b. At normal times, drinking water is supplied by the automatic water supply 28, and at emergency times drinking water is supplied to the feed bucket 13 in each pig house 10. In this case, the feed bucket 13 plays a role of a water vessel as well.

Figure 1A:
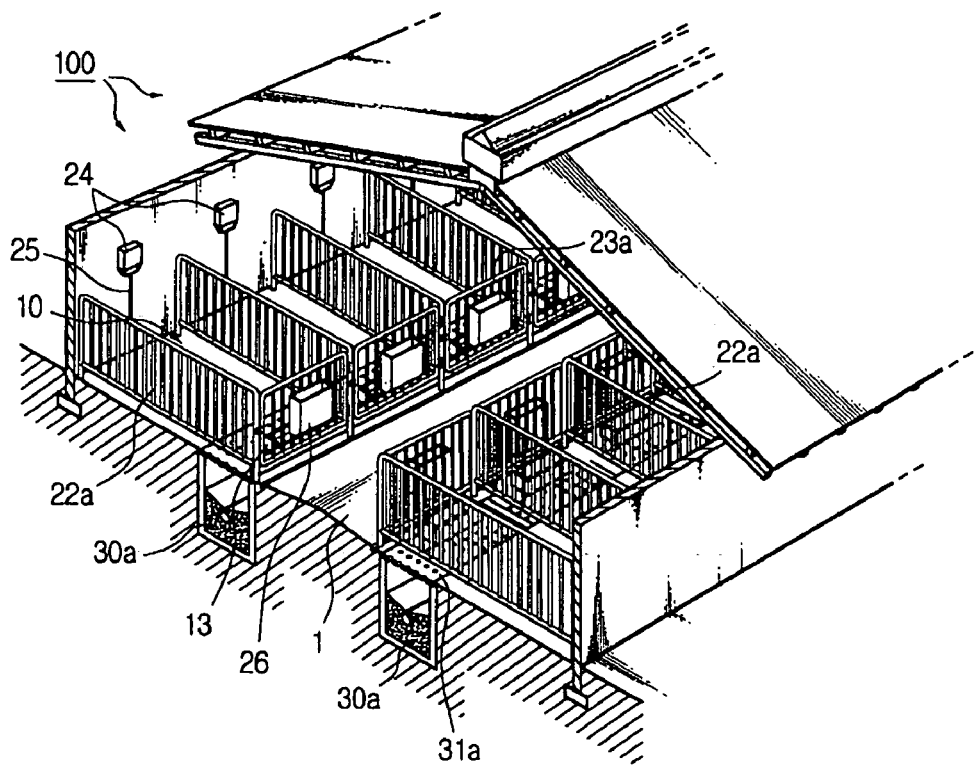
FIG. 1A is an exploded perspective view showing a conventional pigpen structure.
Figure 1B:
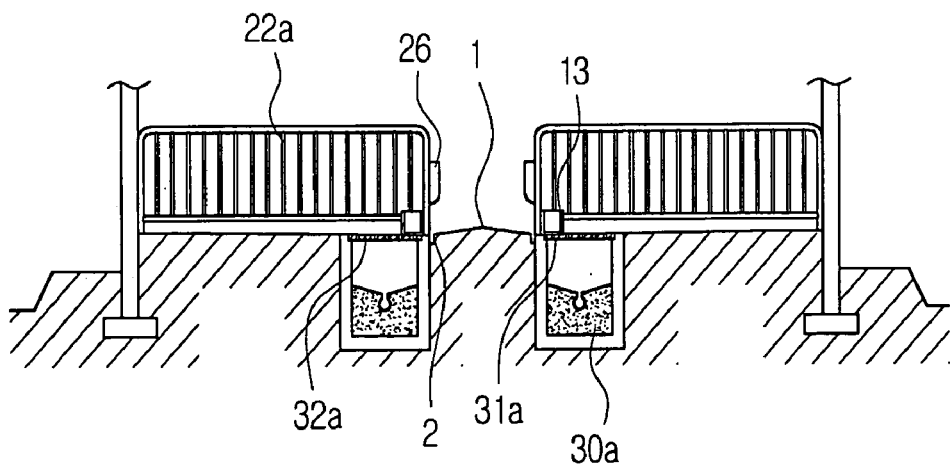
FIG. 1B is a side cross-sectional view of FIG. 1A.
Figure 2A:
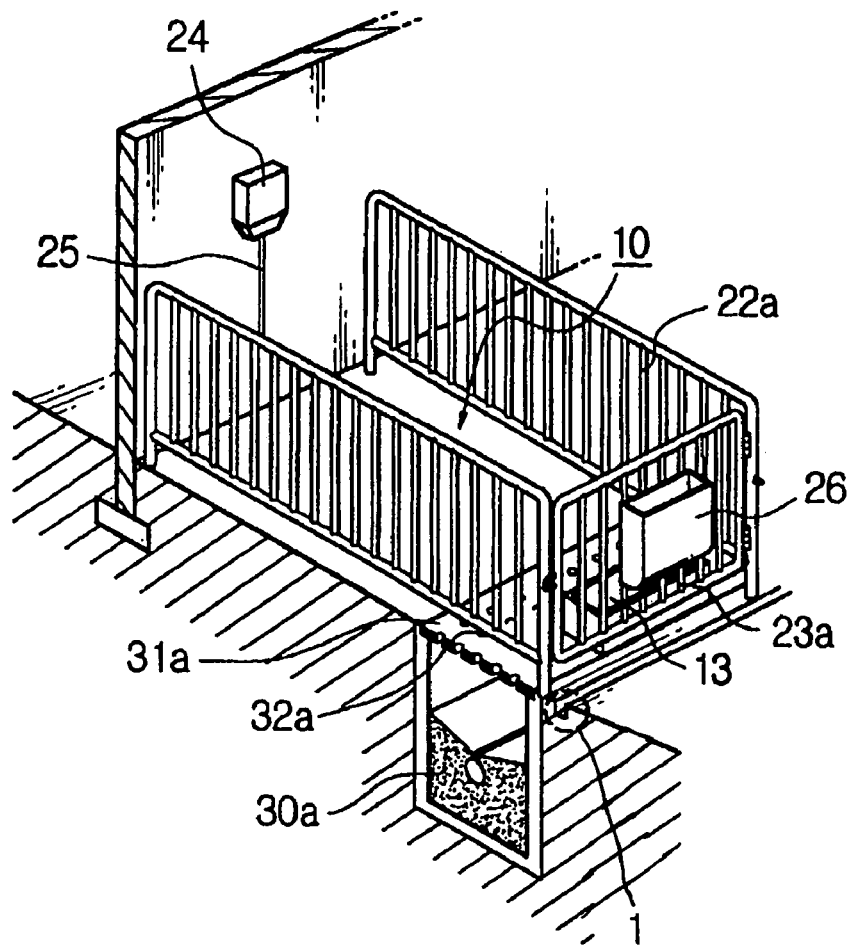
FIGS. 2A–2B are exploded perspective view showing a partial structure of the lateral cross-section of FIG. 1A.
Figure 2B:
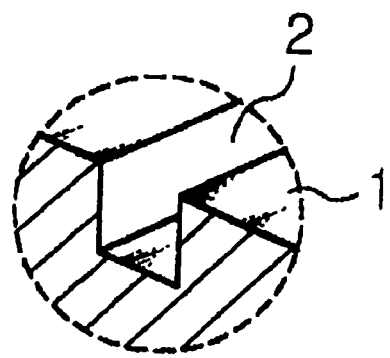
Figure 3:
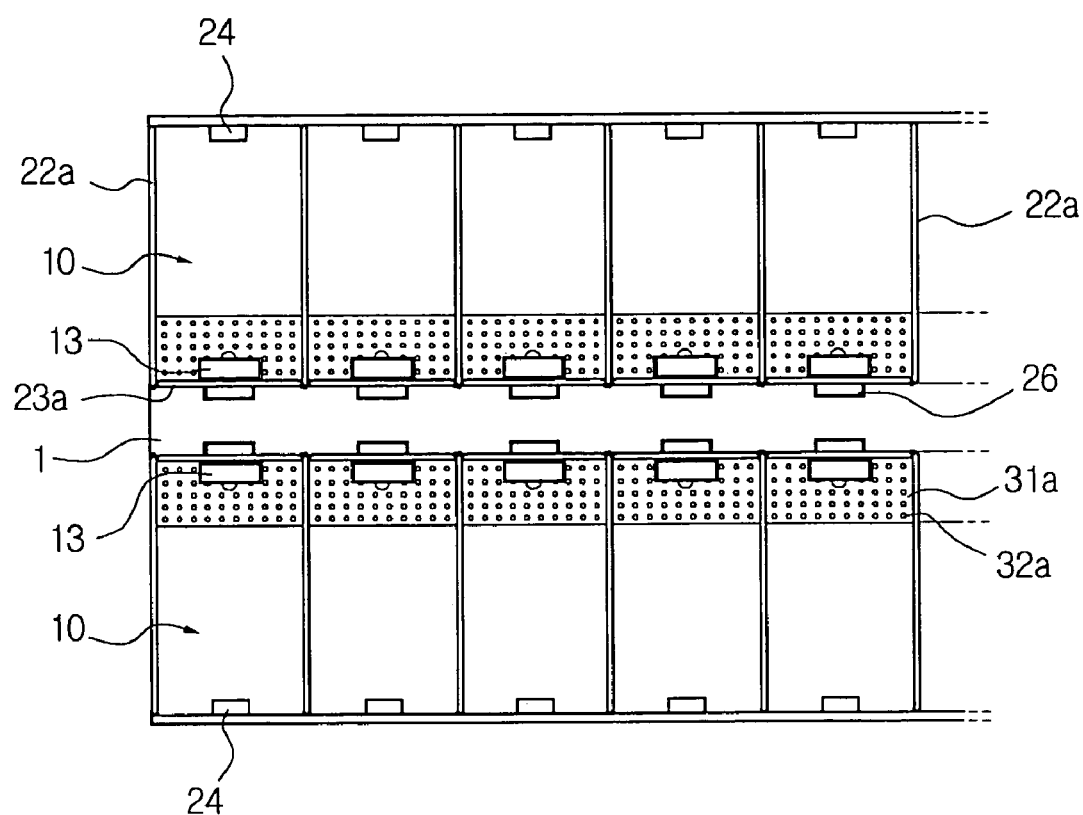
FIG. 3 is a plan view of a conventional pigpen.
Figure 4:
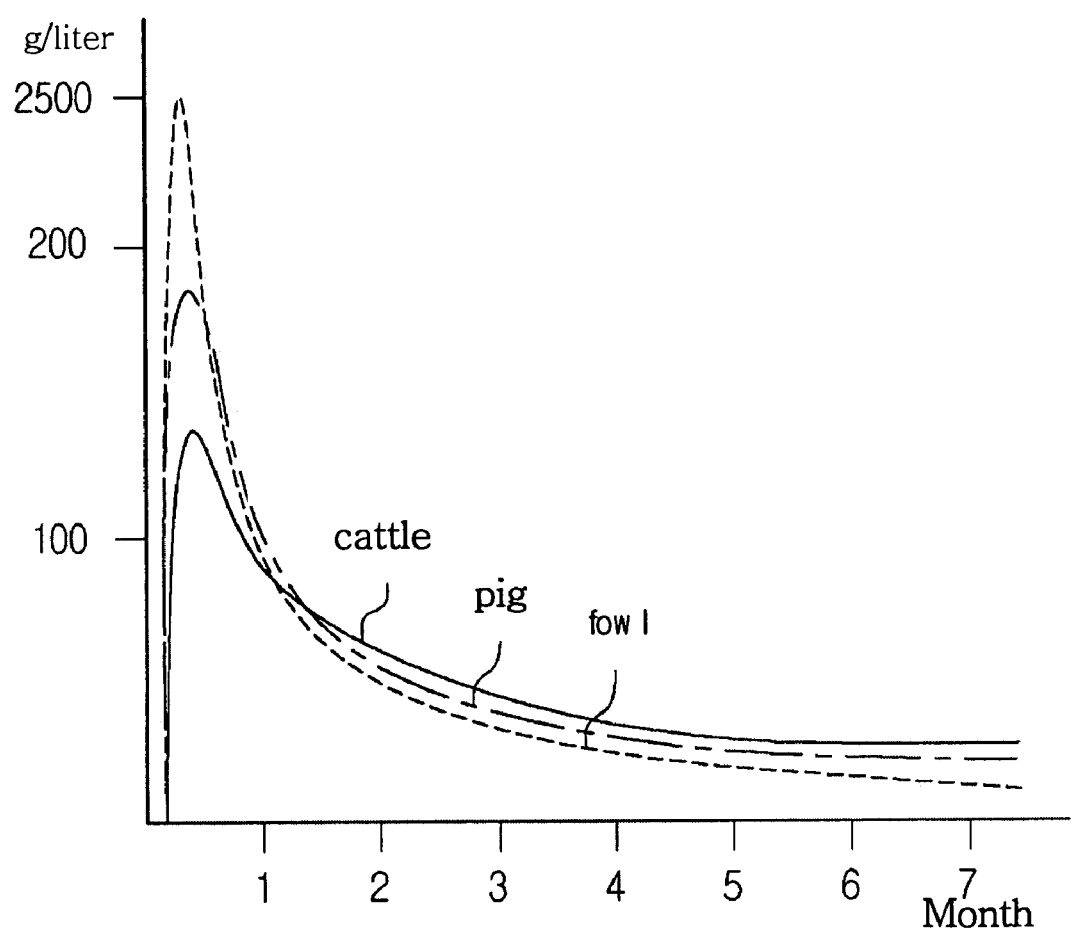
FIG. 4 is a graphical view showing a decomposition proceeding state after having contained wastewater mixed with excretion and urine and sewage in a wastewater tank.

As described above, since the emergency water tap 27 is added in the water supply pipe 23b passing through the front-side lodging room 12 in each pig house 10, a water supply vessel 24 of FIG. 1 and a water supply pipe 25 of FIG. 1 need not be additionally installed as in the existing pigpen. Further, the front-side partitioning pipes 23 in the pig house 10 circulate hot water for heating in which the front-side partitioning pipes 20 in the pig house 10 can be used as a heating water circulation pipe. As shown in FIG. 6, as an alternative of the heating water circulation pipe, a heating pipe 12a can be installed on the bottom surface of the lodging room 12.

Moreover, the working passage 1 provided between the pig houses 10 is preferably formed at a position lower than the height of the pig house 10, preferably by 40~50 cm. The reason is to make a worker in the working passage 1 work without bending his or her waist and at a standing position.

Here, as described above, the partitioning pipes 20 are horizontally installed to thereby conveniently feed without having the spilt feed which may be caused because the work may be hit and interrupted by the partitioning pipes 23 during feeding. Accordingly, the working passage 1 is clean and sanitary. Thus, the existing iron-made feed input vessel 26 is not needed any more.

As described above, the present invention separately provides the evacuation room 11 in each pig house in order to separately collect excretion and urine. Accordingly, the present invention need not do water cleaning and generate cleaning sewage at all. As a result, a wastewater storage tank and a purifying facility for separately filtering and processing wastewater need not be installed under the pig houses. Also, since a BOD concentration of the urine collected separately from the excretion is 5,000 ppm or less, a pigpen wastewater pressing facility which is a resting facility can be used to process water.

As described above, the effects according to the present invention are summarized as follows.

Excretion and urine are separately collected fundamentally in advance. Accordingly, excretion having a small amount of moisture is decomposed and then commercialized, and urine can be used as liquid fertility at once. However, if a breeding business person has no cultivating land, he or she sends the wastewater to a public pigpen wastewater processing facility to be purified. Here, since a BOD concentration of urine is 5,000 ppm or less which can be processed in a nationwide public wastewater processing facility, the public pigpen wastewater processing facility which is a resting facility can be re-run to perform purification.

An existing pigpen processes wastewater post factor, but the pigpen according to the present invention need not do a water cleaning work, and separately collects excretion and urine fundamentally in advance to prevent an environmental pollution.

Pigs are bred by dividing a pig house into an evacuation room and a lodging room. The excretion and urine are separately collected differently from the wastewater mixed with excretion, urine and sewage due to water cleaning in an underground wastewater storage tank in an existing pig house, to thereby prevent harmful insects or bacilli from growing, and thus accomplish a sanitary breeding circumstance.

The present invention installs a urine storage tank under an excretion decompost area far away from a pigpen, differently from a wastewater storage tank installed under each pig house installed in an existing pigpen. Thus, offensive odor or noxious gas generated from the rotten urine stored in the urine storage tank does not go up to the pigpen. Accordingly, pigs can be prevented from being infected with various diseases. As a result, a growth rate of pigs can be heightened and a more comfortable or sanitary working circumstance can be accomplished.

The present invention makes excretion and urine separately collected in each evacuation room, and no works in a working passage, to thereby maintain the working passage cleanly and sanitarily all at times. Accordingly, foreign buyers or visitors can see overall breeding circumstances such as a sanitary breeding circumstance, a comfortable working circumstance, and a practical workability, to thereby promote a reliability with respect to all the breeding processes. As a result, the present invention can contribute an increase of export and solve a difficulty in finding a manpower by improving a worse working circumstance to be a comfortable and sanitary working circumstance.

The height of the partitioning pipes in each pig house is lowered. As a result, a cost of facilities in the pigpen can be saved by about one third or more. Also, since a field of vision in the pigpen 100 is widened, a breeding state of pigs staying in each pig house.

Partitioning pipes are horizontally installed. The pipes are used as a water supply pipe or a heating hot water circulation pipe which is used as a heating device for each pig house.

The upper portions of the pipes are slantly installed toward the pig house. Although the width of the working passage in the pigpen is narrowed in comparison with the conventional art, no impediment occur. Thus, a pigpen area can be effectively used.

An existing pigpen collects wastewater generated by high-pressure water cleaning in order to clean excretion and urines and processes them in a bundle. The present invention separately collects excretion and urine fundamentally and does not perform any water cleaning, to thereby an environment-affinity pigpen structure without generating wastewater basically.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A pig pen structure comprising:
   a walking passage; and
   a plurality of pig houses for housing an animal installed along the walking passage, each pig house comprising:
   an evacuation room;
   a lodging room having front, back, and two side walls;
   an evacuation room gate installed between the evacuation room and the lodging room, wherein the evacuation room is accessible to the animal for excretion when the evacuation room gate is opened, and further wherein the evacuation room gate when closed becomes a part of the back wall;
   a urine tube installed on the bottom of the evacuation room, wherein the excreted urine in the evacuation room flows down to the urine tube to remove the excreted urine outside the pig house
   wherein the plurality of the pig houses are arranged so that the front walls of the pig houses adjoin the walking passage,
   wherein a continuous passage way is formed by the evacuation rooms along the back wall of the lodging room when the evacuation room gates of the pig houses are in closed position,
   wherein the front wall of the pig house comprises a plurality of horizontally running elongated materials; and
   wherein the lower one of the horizontally running elongated materials of the front wall of each pig house form a continuous water pipe for supplying drinking water to the animal.

2. The pig pen structure of claim 1, wherein the front wall is sloped leaning into the lodging room.

3. The pigpen structure of claim 1, wherein the ground level of the walking passage is lower than the ground level of the lodging room.

4. The pigpen structure of claim 1, wherein a power cable is laid over at least one of the four walls of the pig house so that the animal cannot cross over the wall.

5. The pigpen structure of claim 1, wherein at least one of the walls include a pipe for carrying hot water for heating the lodging room.

6. The pigpen structure of claim 1, wherein the ground level of the passage way created by the evacuation rooms of the pig houses when the evacuation room gate is in the closed position is lower than the ground level of any lodging room.

* * * * *